(12) United States Patent
Kessels (10) Patent No.: US 10,061,546 B2
(45) Date of Patent: Aug. 28, 2018

(54) PRINTING SYSTEM COMPRISING A PROOF PRINT REPOSITORY

(71) Applicant: Océ-Technologies B.V., Venlo (NL)

(72) Inventor: Gerardus G. J. C. Kessels, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/499,985

(22) Filed: Apr. 28, 2017

(65) Prior Publication Data

US 2017/0228200 A1 Aug. 10, 2017

Related U.S. Application Data

(63) Continuation of application No. PCT/EP2015/075541, filed on Nov. 3, 2015.

(30) Foreign Application Priority Data

Nov. 7, 2014 (EP) .................................. 14192190

(51) Int. Cl.
*G06F 3/12* (2006.01)
*H04N 1/00* (2006.01)

(52) U.S. Cl.
CPC .......... *G06F 3/1211* (2013.01); *G06F 3/126* (2013.01); *G06F 3/1236* (2013.01); *G06F 3/1268* (2013.01); *G06F 3/1286* (2013.01); *H04N 1/00411* (2013.01)

(58) Field of Classification Search
None
See application file for complete search history.

(56) References Cited

U.S. PATENT DOCUMENTS

2005/0243365 A1* 11/2005 Noda .................... G06F 3/1262
358/1.15
2012/0062911 A1* 3/2012 Robinson ........... H04N 1/00204
358/1.9

* cited by examiner

*Primary Examiner* — Henok A Shiferaw
(74) *Attorney, Agent, or Firm* — Birch, Stewart, Kolasch & Birch, LLP (57) ABSTRACT

The present invention relates to a printing system, comprising a print job receiving section permitting a user to submit a print job to the printing system, the print job comprising a plurality of print job settings, a print job queue section comprising a print job queue for print jobs submitted to the printing system and scheduled to be printed, and a proof print repository section comprising a proof print repository for proof print jobs submitted to the printing system. The printing system comprises a continuous monitoring section configured to compare print job settings of a proof print job residing in the proof print repository or scheduled in the print job queue with current resources available in the printing system according to a proof print policy. The proof print policy is attached to the proof print job and comprises a comparison criterion. Upon a match of the print job settings of the proof print job with the current resources according to the comparison criterion, the proof print job is scheduled in the print job queue.

14 Claims, 11 Drawing Sheets

PRINTING SYSTEM COMPRISING A PROOF PRINT REPOSITORY

CROSS REFERENCE TO RELATED APPLICATIONS

This application is a Continuation of PCT International Application No. PCT/EP2015/075541, filed on Nov. 3, 2015, which claims priority under 35 U.S.C. 119(a) to patent application Ser. No. 14/192,190.8, filed in Europe on Nov. 7, 2014, all of which are hereby expressly incorporated by reference into the present application.

FIELD OF THE INVENTION

The present invention relates to a printing system, comprising a print job receiving section permitting a user to submit a print job to the printing system, the print job comprising a plurality of print job settings, a print job queue section comprising a print job queue for print jobs submitted to the printing system and scheduled to be printed, and a proof print repository section comprising a proof print repository for proof print jobs submitted to the printing system.

BACKGROUND OF THE INVENTION

In a printing system internal logical repositories and queues exist. Print jobs in these repositories and queues are typically intended for print production. A print job may be selected in a repository by a human operator. A proof print job may be initiated on a local user interface of the printing system. A proof print job is a trial print job on at least one sheet in order to check and/or correct corresponding print job settings before producing a copy or a number of copies of the print job. When a proof print job is initiated at the local user interface of the printing system, a copy of the actual print job is made into the print job queue known as the proof print job, the number of copies is automatically modified to one, the proof print job is printed and the proof print job is not registered in a printed jobs queue once printed. The proof print job is further handled as a production print job with respect to the print job settings.

In a printing system printing of a single proof print job may be disruptive for the productivity of the printing system, especially when media changes are necessary with respect to a print job scheduled before the proof print job and/or a print job scheduled after the proof print job.

It is an objective of the present invention to provide a printing system that permits to increase productivity of the printing system with regard to proof print jobs.

SUMMARY OF THE INVENTION

In order to achieve this objective, according to the present invention, the printing system comprises a continuous monitoring section configured to compare print job settings of a proof print job residing in the proof print repository or scheduled in the print job queue with current resources available in the printing system according to a proof print policy, the proof print policy being attached to the proof print job and comprising a comparison criterion, and wherein upon a match of the print job settings of the proof print job with the current resources according to the comparison criterion, the proof print job is scheduled in the print job queue.

By doing so the proof print job is scheduled in the print job queue and will be printed on the needed resources, like recording material and marking material, which are available in the printing system. The comparison criterion may vary from a complete criterion to an incomplete criterion on a single aspect of the proof print job. The complete criterion means that all production characteristics needed for the proof print job and expressed in the proof print job settings, i.e. recording material, marking material and finishing, must match with the resources that are available in the printing system. An incomplete criterion may mean that a single aspect of the proof print job must match, e.g. the same size of recording material as intended for the production run of the corresponding print job, irrespective of the media type.

The proof print job in the proof print repository is continuously monitored and when the relevant resource-related settings of the proof print job match with the current resources available in the printing system, the proof print job is a candidate to be printed. The proof print job is then scheduled at a position in the print job queue, which position is a best position in the print job queue according to the comparison criterion. Such a best position may be a first position in the print job queue after the print job which is currently printed. Such a best position may be a position after the last print job scheduled in the print job queue that is intended to use the same resources as the proof print job. The scheduling may be done automatically by the printing system or may be done after approval by the engine operator via the local user interface. The best position may be defaulted by a system setting of the printing system.

At each moment that resources like recording material and/or marking material have to be changed, the best position for a proof print job which is already scheduled in the print job queue may also be changed. This may be for example the case when a rush print job is inserted at the top of the print job queue. The rush print job may need other resources than the current resources. The best position for a proof print job which is already scheduled in the print job queue may be after the rush print job if the changed resources match the settings of the proof print job according to the comparison criterion of the proof print job.

The comparison criterion may be relaxed for a proof print job in the proof print repository or in the print job queue. For example, recording material must only match a size, or the recording material must match a media type and a weight, or the recording material must match media type and weight, but not the size—so scaling is allowed—, or the recording material may be larger—no scaling, but centred printing is intended. The relaxation of the comparison criterion increases the chance that a proof print job can be printed as soon as possible in between production print jobs without disturbing production. A print job corresponding to the proof print job may be scheduled in the print job queue after the proof print job is printed and approved.

According to an embodiment the comparison criterion is based on at least one out of at least one medium type property of the current resources, a print mode specified in the print job, a color profile specified in the print job and at least one marking material property of the current resources.

According to an embodiment the proof print policy comprises a scheduling option, and, upon a match of the print job settings of the proof print job with the current resources according to the comparison criterion, the proof print job is scheduled at a position in the print job queue according to the scheduling option. The scheduling option may determine a desired position in the print job queue, a desired moment in time of printing the proof print job, an option to manually place the proof print job in the print job queue, a desired output holder at which the proof print job is to be delivered, and an option what to do with the proof print job in the proof print repository after the proof print job has been printed.

According to an embodiment the continuous monitoring section is configured to compare print job settings of a proof print job residing in the proof print repository or scheduled in the print job queue with print job settings of each print job in the print job queue according to the comparison criterion, wherein, upon a mismatch of the print job settings of the proof print job with the current resources, the continuous monitoring system compares the print job settings of the proof print job with print job settings of each print job in the print job queue according to the comparison criterion, and, upon a match of the print job settings of the proof print job with print job settings of one of the print jobs in the print job queue, the proof print job is scheduled before or after the one print job in the print job queue according to the scheduling option, and, upon a mismatch of the print job settings of the proof print job with print job settings of each of the print jobs in the print job queue, the proof print job is moved back into or remains in the proof print repository.

By scheduling the proof print job in this manner, a number of moments of recording material changes during printing the print jobs in the print job queue decreases, since the print jobs in the print job queue can only be printed when the needed resources are available in the printing system. The decrease of moments of recording material changes leads to a larger throughput of the printing system. The decision whether to schedule the proof print job before or after the one print job may be defaulted by the printing system or may be entered on request by the printing system via the local user interface by an operator.

According to an embodiment the proof print repository is configured to maintain a proof print status for each proof print job in the proof print repository. Such a proof print status may be changed by a human being via a remote application and/or via a local user interface of the printing system. The proof print status may be "awaiting approval", "approved" or "rejected". The continuous monitoring section may respond to a change of the proof print status. For example, the proof print job may be moved automatically to a specific destination such as the print job queue or an archive repository. Thus a print job corresponding to the proof print job is then scheduled in the print job queue after the proof print job is printed and approved. This embodiment facilitates an easy approval workflow.

According to an embodiment the printing system comprises a proof print logging section which is configured to keep an automatic log of the proof print jobs in the proof print repository. At the end of a predetermined time period—one hour, one day, etc.—such a log may be printed for the operator or displayed at an operator's monitor. The log may be exported or retrieved in electronic format from the printing system.

According to an embodiment the proof print policy comprises an adornment option for adding a digital adornment to the proof print job. The digital adornment may be added to at least one digital image of the proof print job. The digital adornment may be added in the form of an additional banner page. By doing so, the proof print job is distinguishable from production print jobs printed according to the print job queue. The digital adornment may be a color stamp which can be physically signed off. The digital adornment may also carry other print information, e.g. an engine identifier, a last (color) calibration time, color control bars, selection of settings made in a print job submitter. The addition of the digital adornment reduces manual handling by order managers and adds more logging to printed proof print jobs which may be used for reprint purposes. The digital adornment may also comprise a machine readable code—a bar code, a QR code, etc.—which represent settings of the proof print job.

The present invention also relates to a method for scheduling proof print jobs in a printing system, the printing system comprising a print job receiving section permitting a user to submit a print job to the printing system, the print job comprising a plurality of print job settings, a print job queue section comprising a print job queue for print jobs submitted to the printing system and scheduled to be printed, and a proof print repository section comprising a proof print repository for proof print jobs submitted to the printing system, wherein the method comprises the steps of continuously comparing print job settings of a proof print job residing in the proof print repository or scheduled in the print job queue with current resources available in the printing system according to a proof print policy attached to the proof print job, the proof print policy comprising a comparison criterion, and upon a match of the print job settings of the proof print job with the current resources according to the comparison criterion, scheduling the proof print job in the print job queue.

According to an embodiment of the method the proof print policy comprises a scheduling option and the method comprises the step of, upon a match of the print job settings of the proof print job with the current resources according to the comparison criterion, scheduling the proof print job at a position in the print job queue according to the scheduling option.

According to an embodiment the method comprises the steps of, upon a mismatch of the print job settings of the proof print job with the current resources, comparing the print job settings of the proof print job with print job settings of each print job in the print job queue according to the comparison criterion, upon a match of the print job settings of the proof print job with print job settings of one of the print jobs in the print job queue, scheduling the proof print job before or after the one print job in the print job queue according to the scheduling option, and upon a mismatch of the print job settings of the proof print job with print job settings of each of the print jobs in the print job queue, moving the proof print job back into the proof print repository if the proof print job is residing in the print job queue or keeping the proof print job in the proof print repository if the proof print job is residing in the proof print repository.

According to an embodiment of the method the proof print policy comprises an adornment option and the method comprises the step of adding a digital adornment to at least one digital image of the proof print job.

The present invention also relates to a software product comprising program code on a non-transitory computer-readable medium, wherein said program code, when loaded into a computer that is connected to or is part of a printing system according to the present invention causes the computer to act according to a method of the present invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

Preferred embodiments will now be described in conjunction with the drawings, wherein.

DETAILED DESCRIPTION OF THE EMBODIMENTS

Figure 1:
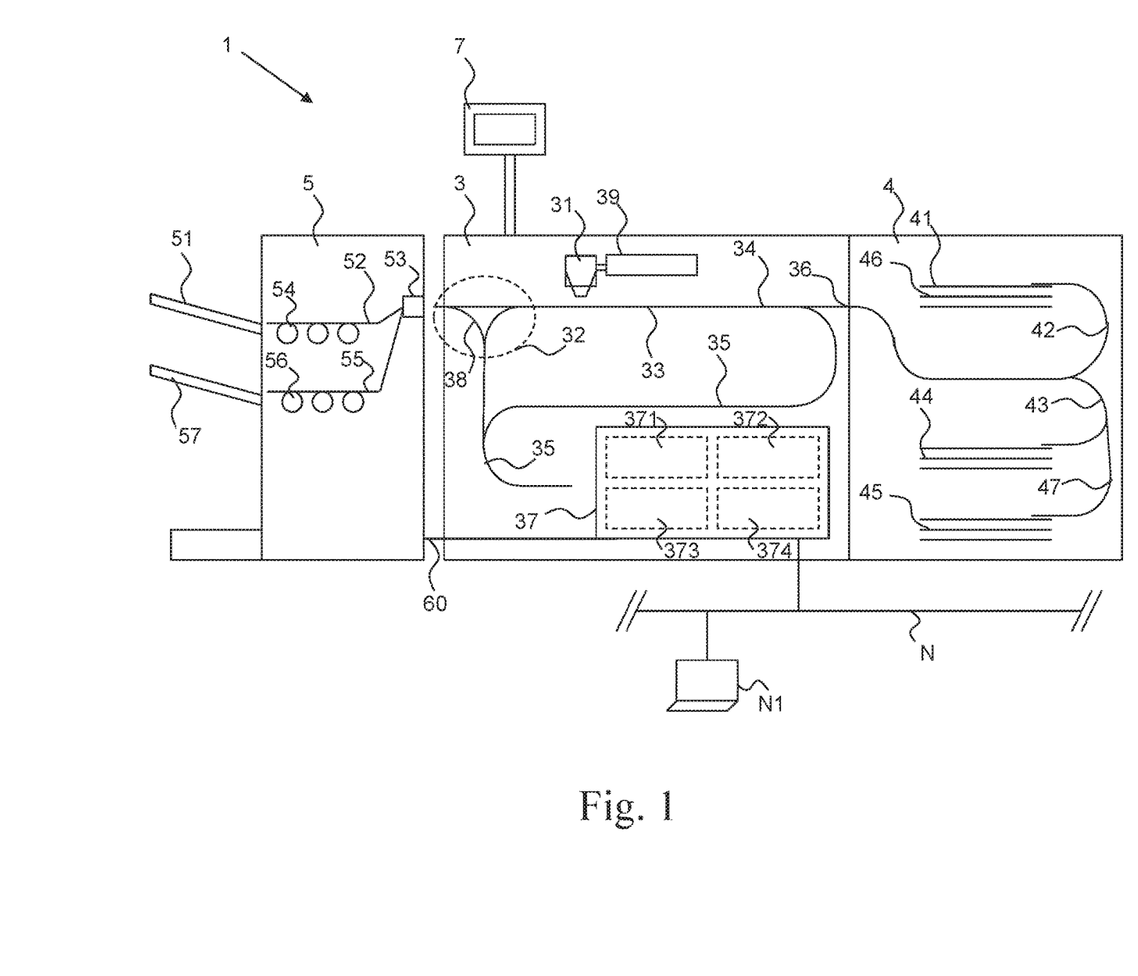
FIG. 1 is a schematic view of the printing system according to the present invention.

FIG. 1 shows schematically an embodiment of a printing system 1 according to the present invention. The printing system 1, for purposes of explanation, is divided into an output section 5, a print engine and control section 3, a local user interface 7 and an input section 4. While a specific printing system is shown and described, the disclosed embodiments may be used with other types of printing system such as ink jet, electrographic, etc.

The output section 5 comprises a first output holder 52 for holding printed image receiving material. In an embodiment the output section 5 comprises a second output holder 55 for holding printed proof prints. The printed image receiving material is transported from the print engine and control section 3 via an inlet 53 to the output section 5. When a stack ejection command is invoked by the control unit 37 for the first output holder 52, first guiding means 54 are activated in order to eject the stack on the first output holder 52 outwards to a first external output holder 51. The operator can take the stack from the first external output holder 51 for further processing the outputted documents in the stack. When a stack ejection command is invoked by the control unit 37 for the second output holder 55, second guiding means 56 are activated in order to eject the one or more proof prints on the second output holder 55 outwards to a second external output holder 57. The operator can take the one or more proof prints from the second external output holder 57 for further processing, for example an assessment of the one or more proof prints leading to an approval or a disapproval of the one or more proof prints.

Finishing equipment may be added to or replace the first external holder 51 for further finishing the ejected stack. The first internal output holder 52 may not be reachable by an operator. In the latter case the operator cannot take the stack from the first internal output holder 52 for further processing, but he can only take the stack from the first external output holder 51 for further processing. The second internal output holder 55 may not be reachable by an operator. In the latter case the operator cannot take the one or more proof prints from the internal output holder 55 for further processing, but he can only take the one or more proof prints from the second external output holder 57 for further processing.

The output section 5 is digitally connected by means of a cable 60 to the print engine and control section 3 for bi-directional data signal transfer.

The print engine and control section 3 comprises a print engine and a control unit 37 for controlling the printing process. The control unit 37 is a computer, a server or a workstation, connected to the print engine and connected to the digital environment of the printing system, for example a network N for transmitting a submitted print job to the printing system 1. In FIG. 1 the control unit 37 is positioned inside the print engine and control section 3, but the control unit 37 may also be positioned outside the print engine and control section 3 in connection with the network N in a workstation N1.

The control unit 37 comprises a print job receiving section 371 permitting a user to submit a print job to the printing system 1, the print job comprising image data to be printed and a plurality of print job settings. The control unit 37 comprises a print job queue section 372 comprising a print job queue for print jobs submitted to the printing system 1 and scheduled to be printed. The control unit 37 comprises a proof print repository section 373 comprising a proof print repository for proof print jobs submitted to the printing system 1. The control unit comprises a continuous monitoring section 374 configured to compare print job settings of a proof print job residing in the proof print repository or scheduled in the print job queue with current resources available in the printing system according to a comparison criterion according to the present invention. The current resources may be recording material located in the input section 4, marking material located in a reservoir 39 near or in a print head or print assembly 31 of the print engine, or finishing resources like staples, paper clips, binding material, etc.

The print head or print assembly 31 is suitable for ejecting and/or fixing marking material to image receiving material and a paper path 34, 32, 35 for transporting the image receiving material from an entry point 36 of the print engine and control section 3 to the inlet 53 of the output section 5. The print head or print assembly 31 is positioned near the paper path section 34. The print head or print assembly 31 may be an inkjet print head, a direct imaging toner assembly or an indirect imaging toner assembly. While an image receiving material is transported along the paper path section 34, the image receiving material receives the marking material through the print head or print assembly 31. A next paper path section 32 is a flip unit for selecting a different subsequent paper path for simplex or duplex printing of the image receiving material. The flip unit 32 may be also used to flip a sheet of image receiving material after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

When the image receiving material has been printed upon, the image receiving material is transported to the inlet 53 of the output section 5.

The input section 4 may comprise at least one input holder 44, 45, 46 for holding the image receiving material before transporting the sheets of image receiving material to the print engine and control section 3. Sheets of image receiving material are guided from the input holders 44, 45, 46 by guiding means 42, 43, 47 to an outlet 36 for entrance in the print engine and control section 3.

The local user interface 7 is suitable for displaying user interface windows for controlling the print job queue residing in the control unit 37. In another embodiment a computer N1 in the network N has a user interface for displaying and controlling the print job queue of the printing system 1.

Figure 2:
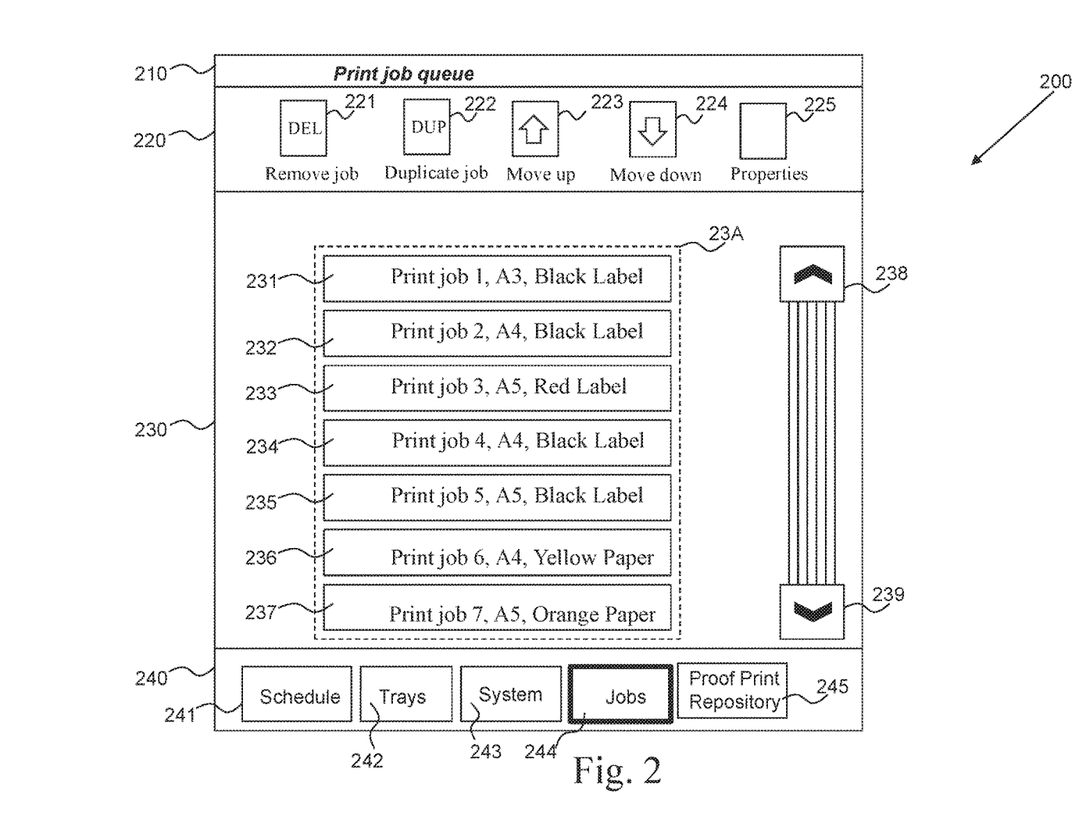
FIG. 2 is a schematic view of a print job queue in a printing system according to the present invention.

FIG. 2 shows a user interface window 200 of the printing system 1 according to the present invention. In an alternative embodiment part of the functionality—like buttons—of this user interface window is designed as hardware buttons near the user interface window 200. The user interface window 200 is opened at the local user interface 7 in FIG. 1 and shows a representation of the print job queue residing in the control unit 37 in FIG. 1.

The user interface window 200 comprises a title section 210, a user action section 220, a print job queue section 230 and a navigation section 240.

The user action section 220 comprises user operable items 221-225 to be selected for executing actions on one or more selected print jobs in the print job queue 23A in the print job queue section 230.

A first user operable item 221 represents a job removal action.

A second user operable item 222 represents a job duplication action.

A third user operable item 223 represents a move up action.

A fourth user operable item 224 represents a move down action.

A fifth user operable item 225 represents an action to retrieve and display properties and settings of a selected print job in a properties window (not shown).

The user action section 220 may additionally comprise a user operable item for creating a proof print job from a selected print job in the print job queue 23A.

The navigation section 240 comprises a first user operable item 241 for navigating to a schedule with a timeline and media needed for the print jobs, a second user operable item 242 for navigating to an overview of the input trays and the content of the input trays, a third user operable item 243 for navigating to the system settings, a fourth user operable item 244 for navigating to the print jobs in the print job queue 23A, and a fifth user operable item 245 for navigating to the proof print jobs in the proof print repository. In the user interface window 200 the fourth user operable item 244 is selected.

The print job queue section 230 comprises a representation of the print job queue 23A. The print job queue 23A may be empty or comprises at least one print job. FIG. 2 shows a plurality of print jobs 231-237 in the print job queue 23A in a sequence order from top to bottom. A first print job 231 will be printed real soon after the current print job that is currently printed by the printing device is ready. A last print job 237 will be printed if the preceding print jobs 231-236 are ready. Each print job 231-237 in the print job queue 23A is selectable by a mouse or by a finger or stylus in case of a touch screen. A sequence order of the print jobs 231-237 in the print job queue 23A may be changed by selecting a print job in the print job queue 23A and then activating the third user operable item 223 or the fourth user operable item 224 in order to move the selected print job one position up or down respectively in the print job queue 23A. In a further embodiment in case of a touch screen a position of a print job 231-237 in the print job queue 23A may be changed by dragging and dropping the appropriate print job to another position in the print queue. The print job queue 23A is scrollable by activating an upward scrolling button 238 or a downward scrolling button 239. Each print job 231-237 in the print job queue 23A may be displayed with a number of properties of the print job, such as an identifying name of the print job ("Print job 1"), a size of the image receiving material to be used for the print job ("A3"), the medium type of the image receiving material ("Black Label"), etc. For convenience reasons a small relevant number of properties for each print job 231-237 is displayed in the print job queue 23A.

Figure 3:
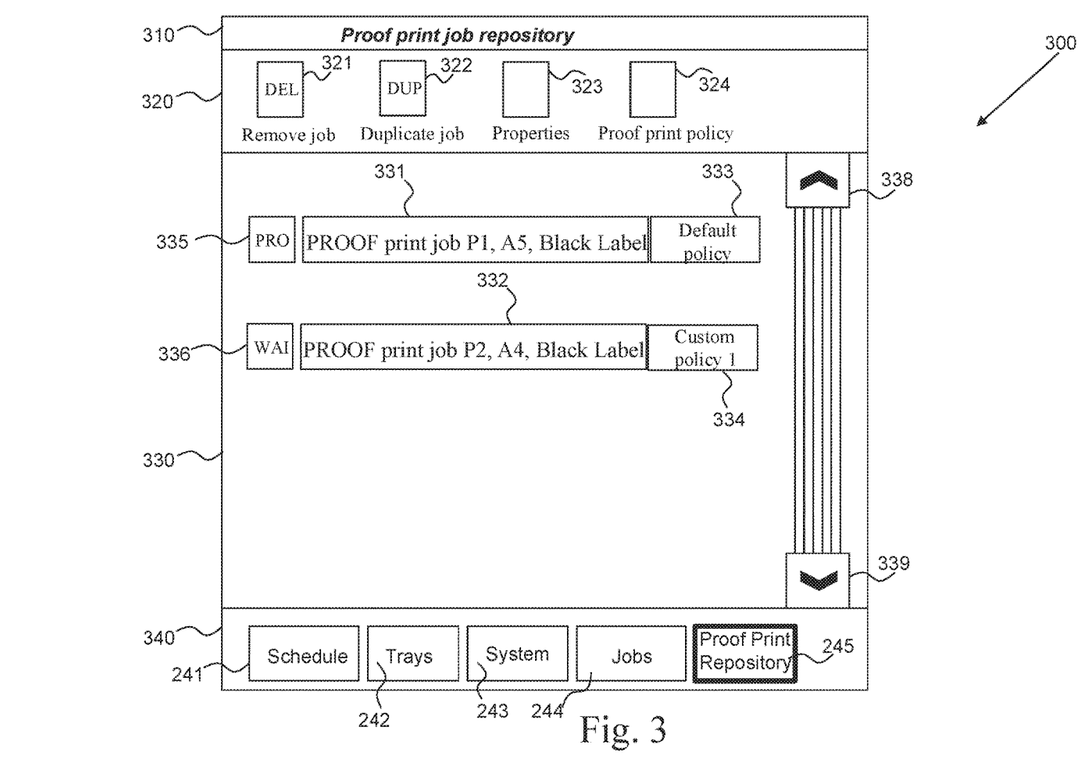
FIG. 3 is a schematic view of the proof print repository section according to the present invention.

FIG. 3 shows a user interface window 300 of the printing system 1 according to the present invention. In an alternative embodiment part of the functionality—like buttons—of this user interface window is designed as hardware buttons near the user interface window 300. The user interface window 300 may be opened at the local user interface 7 in FIG. 1 and shows a representation of the proof print repository 373 residing in the control unit 37 in FIG. 1. The user interface window 300 may be reached by selecting the fifth user operable item 245 in FIG. 2 for navigating to the proof print jobs in the proof print repository 373 in FIG. 1.

The user interface window 300 comprises a title section 310, a user action section 320, a proof print job repository section 330 and a navigation section 340.

The user action section 320 comprises user operable items 321-324 to be selected for executing actions on the proof print jobs 331, 332 shown in the proof print job repository section 330.

A first user operable item 321 represents a proof print job removal action.

A second user operable item 322 represents a proof print job duplication action.

A third user operable item 323 represents an action to retrieve and display properties and settings of a selected proof print job in a properties window (not shown).

Figure 4:
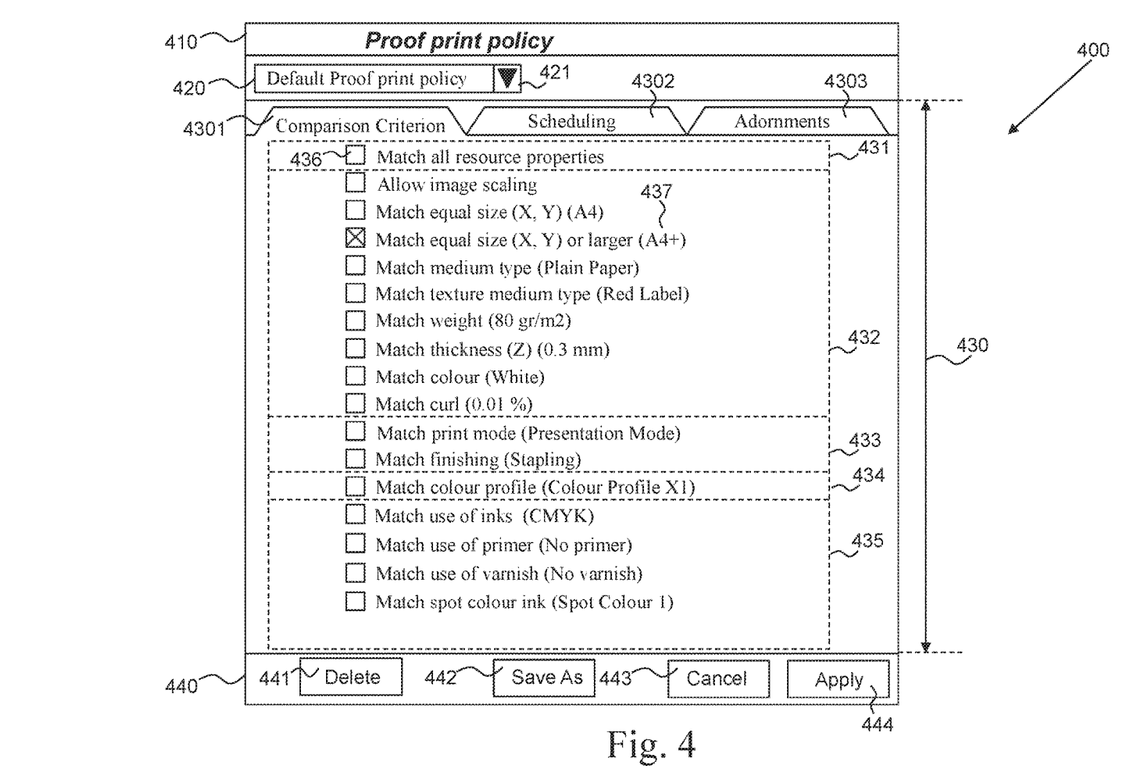
FIG. 4 is a schematic view of a comparison criterion window of the proof print policy according to the present invention.

A fourth user operable item 324 represents a user action to edit the proof print policy of a selected proof print job in a proof print policy window as shown in FIG. 4.

The navigation section 340 comprises the same user operable items 241-245 as shown in the navigation section 240 shown in FIG. 2. In the user interface window 300 the fifth user operable item 245 is selected.

The proof print job repository section 330 comprises a representation for each proof print job in the proof print repository 373 in FIG. 1. FIG. 3 shows a plurality of proof print jobs 331, 332 in the proof print job repository section 330 in an arbitrary sequence order.

The proof print jobs 331, 332 have been submitted to the printing system or copied from another repository of print jobs in the printing system. A job submitter tool running on a workstation connected to the network N shown in FIG. 1 may comprise a setting that the print job is a proof print job. When submitting such a print job this print job will be submitted into the proof print repository instead of into the ordinary print job queue of the printing system. The user action section 320 may comprise a user operable item for creating a proof print job from an ordinary print job in the print job queue or from a document file selected from a file directory of the user.

Each proof print job 331, 332 in the proof print job repository section 330 is selectable by a mouse or by a finger or stylus in case of a touch screen. A proof print policy 333, 334 is attached to each proof print job 331, 332 respectively. When a proof print job is submitted or copied to the proof print repository the proof print job may initially have a default proof print policy attached to it. The default proof print policy may represent a general proof print policy suitable for the printing system or may be a predefined proof print policy determined by a setting value of a destination of the proof print job, a ticket setting of the proof print job—for example an order manager of the proof print job—, or explicitly the predefined proof print policy itself.

When a proof print job has been selected, each of the user operable items 321-324 in the user action section 320 may be activated in order to remove the selected proof print job, to duplicate the selected proof print job, to show print job settings and print job properties of the selected proof print job, or to edit the proof print policy attached to the selected proof print job, respectively.

Each proof print job 331, 332 may be accompanied by a status item 335, 336 respectively of indicating the status of the proof print job, for example a status item with the text "PRO" for a proofed proof print job, a status item with the text "WAI" for a proof print job waiting for approval, etc. The proof print repository section 330 is scrollable by activating an upward scrolling button 338 or a downward scrolling button 339 in case the number of proof print jobs does not fit in a displayed part of the proof print repository section 330. To quickly find a proof print job in the proof print repository section 330, a search option, a filter option and/or a sort option may be added to the proof print repository section 330. Each proof print job 331, 332 in the proof print job repository section 330 may be displayed with a number of properties of the proof print job, such as an identifying name of the print job ("PROOF Print job P1"), a size of the image receiving material to be used for the proof print job ("A5"), the medium type of the image receiving material ("Black Label"), etc. For convenience reasons a small relevant number of properties for each proof print job 331, 332 is displayed in the proof print job repository section 330.

The control unit 37 of the printing system 1 in FIG. 1 comprises the continuous monitoring section 374 configured to compare print job settings of one of the proof print job 331, 332 represented in FIG. 3 and residing in the proof print repository 373 with current resources available in the printing system according to a comparison criterion. The current resources may be recording material in the input section 4 of printing system 1 located in at least one of the input holders 44, 45, 46 (See FIG. 1). The current resources may also be marking material residing in the reservoir 39 near or in the print head or print assembly 31 (See FIG. 1).

When the fourth user operable item 324 is activated a proof print policy user interface window 400 is displayed as shown in FIG. 4.

The user interface window 400 comprises a title section 410, a proof print policy selection drop down box 420, a proof print policy specification section 430 and a navigation section 440.

The proof print policy selection drop down box 420 comprises a list of already available proof print policies which can be scrolled to via a scroll item 421.

The navigation section 440 comprises a first user operable item 441 to delete a proof print policy which is selected in the proof print policy selection drop down box 420, a second user operable item 442 to save a proof print policy edited under another print proof policy name, a third user operable item 443 to cancel the action on the user interface window 400 and to return to the user interface window 300 in FIG. 3, and a fourth user operable item 444 to apply the proof print policy specified in the proof print policy specification section 430. The first user operable item 441 may be disabled when a last proof print policy is left over in order to avoid a situation that no proof print policy s exists at all.

The proof print policy specification section 430 may comprise three tab sections 4301-4303. The first tab section 4301 comprises the comparison criterion according to the present invention. The second tab section 4302 comprises the scheduling option according to the present invention. The third tab section 4303 comprises the adornment specification according to the present invention. In a first embodiment of the present invention only the first tab section 4301 is provided (not shown). In a second embodiment of the present invention the first tab section 4301 and the second tab section 4302 are provided. In a third embodiment of the present invention the first tab section 4301, the second tab section 4302 and the third tab section 4303 are provided. For convenience reasons the first tab section 4301, the second tab section 4302 and the third tab section 4303 are displayed in user interface window 400 elucidating the third embodiment, but the first and second embodiment mentioned hereabove are also part of the present invention.

The first tab section 4301 comprises the comparison criterion according to the present invention.

The comparison criterion can be set by checking check boxes 436 for each item in the comparison criterion. The items in the comparison criterion are divided into item sections 431-435. The first item section 431 comprises an item for matching all properties of the current resources. The second item section 432 comprises items for matching parts of the receiving material used for printing the proof print job. The third item section 433 comprises items for matching a print mode or a specified finishing. The fourth item section 434 comprises an item for matching a color profile to be used when printing the proof print job. The fifth item section 435 comprises items for matching the marking material present in the printing system.

Each of the checkboxes 436 may be checked. If a contradiction is introduced by a combination of checked checkboxes the user is warned by means of a message display window on top of the user interface window 400 or otherwise.

Figure 5:
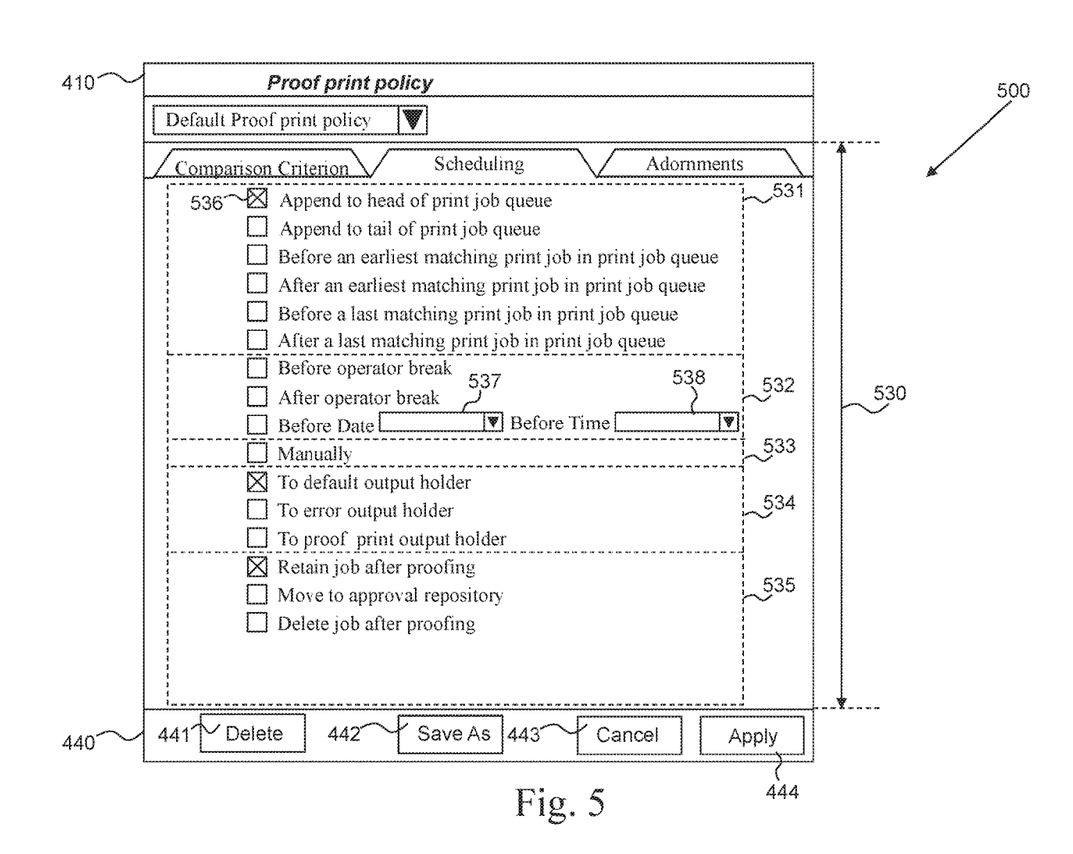
FIG. 5 is a schematic view of a scheduling option window of the proof print policy according to the present invention.

The second tab section 4302 comprises the scheduling option according to the present invention as shown in a user interface window 500 in FIG. 5. The scheduling option can be set by checking check boxes 536 for each item in a scheduling section 530. The items in the scheduling section 530 are divided into item sections 531-535.

The first item section 531 comprises items for a desired position at which the proof print job may be placed in the print job queue.

The second item section 532 comprises items for a desired moment in time of the printing of the proof print job. For example, a date 537 and a time 538 may be selectable before which date-time the proof print job has to be printed.

The third item section 533 comprises an item for manually positioning a proof print job in the print job queue. As a default the proof print job may be positioned at the tail of the print job queue and positioned at the desired position by means of the fourth user operable item 224 in FIG. 2.

The fourth item section 534 comprises items for determining the output holder at which the printed proof print job is desired to be delivered. A default output holder may already be checked.

The fifth item section 535 comprises items for determining what to do with the proof print jobs in the proof print repository after the proof print job has been printed. One possible option is that an approved proof print job is moved to an approval repository. Such an approval repository may be part of the control unit of the printing system or residing on a user workstation connected to the network N in FIG. 1.

Each of the checkboxes 536 may be checked. If a contradiction is introduced by a combination of checked checkboxes the user is warned by means of a message display window on top of the user interface window 500 or otherwise.

Figure 6:
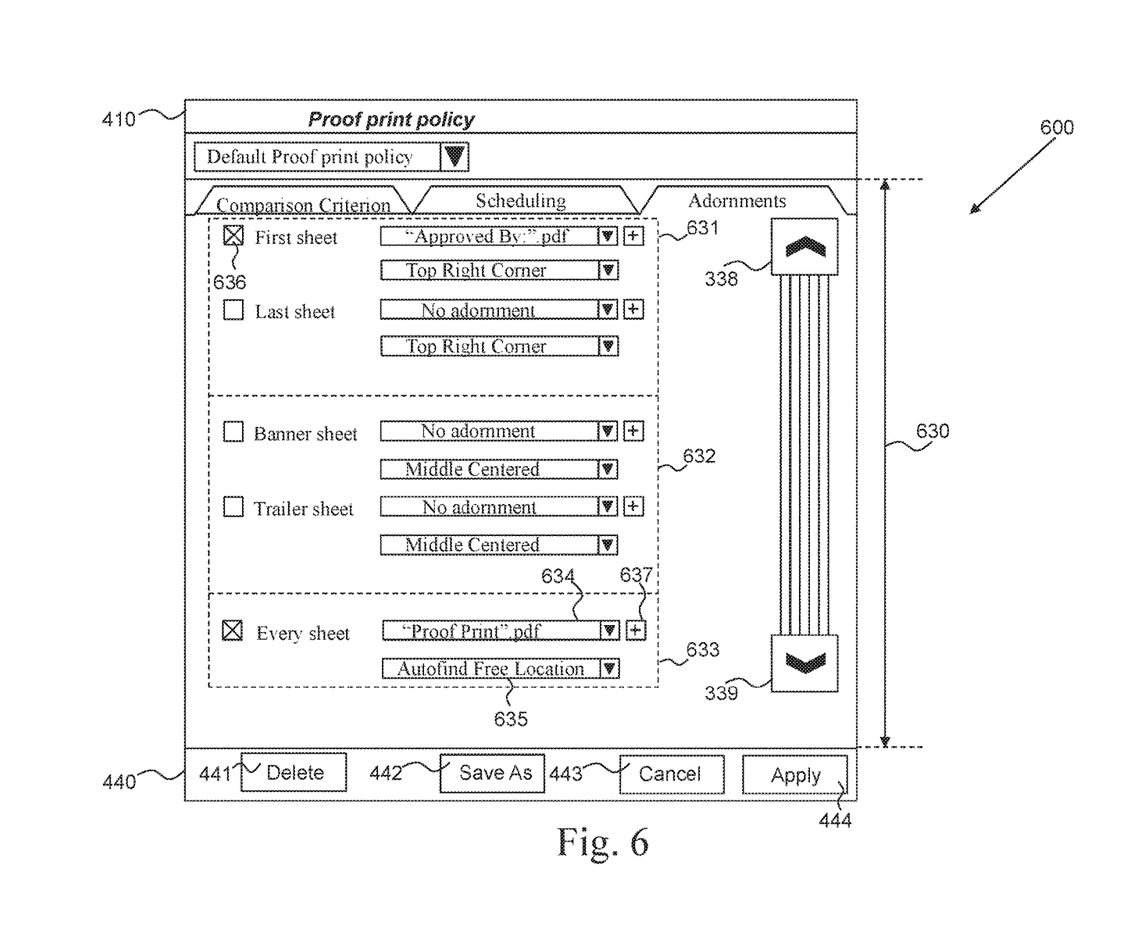
FIG. 6 is a schematic view of an adornment option window of the proof print policy according to the present invention.

The third tab section 4303 comprises the adornment specification according to the present invention as shown in a user interface window 600 in FIG. 6. The adornment specification can be set by checking check boxes 636 for each adornment item in an adornment section 630. The adornment items in the adornment section 630 are divided into item sections 631-633. The first item section 631 comprises adornment items for a desired adornment on the first or last sheet of the proof print job. The second item section 632 comprises adornment items for a desired adornment on a banner or trailer sheet to be added to the proof print job. The third item section 533 comprises an adornment item for a desired adornment for each sheet of the proof print job.

Each adornment item in the adornment section 630 may be specified by a selection box 634 with a scroll item 635. The selection box 634 may comprise file names of files in an image format, like a portable document format, JPEG format, TIFF format, etc. Those files may be stored in storage of the control unit of the printing system at configuration of the printing system. More than one adornment per adornment item may be specified by means of a plus operator item 637. For each adornment item a location on the sheet may be specified by means of a location selection box 635. The location may be for example "top right corner", "top left corner", "top centred", "middle right", "middle centred", "middle left", "bottom right corner", "bottom centred", "bottom left corner", "XY position", "autofind free location", etc. The adornment in the form of a text image "Approved by:" on a sheet of the proof print job is advantageous when sending the printed proof print job to the customer for approval. In some cases more than one person has to approve and all signatures can be gathered before printing the actual print job corresponding to the proof print job. In a further embodiment a setting that the adornment is an underlay user operable item or an overlay user operable item may be set per adornment item.

Each of the checkboxes 636 may be checked. If a contradiction is introduced by a combination of checked checkboxes the user is warned by means of a message display window on top of the user interface window 600 or otherwise.

FIG. 7-11 are examples of a user interface window 700-1100 of the print job queue in which a proof print job is scheduled according to the present invention.

Figure 7:
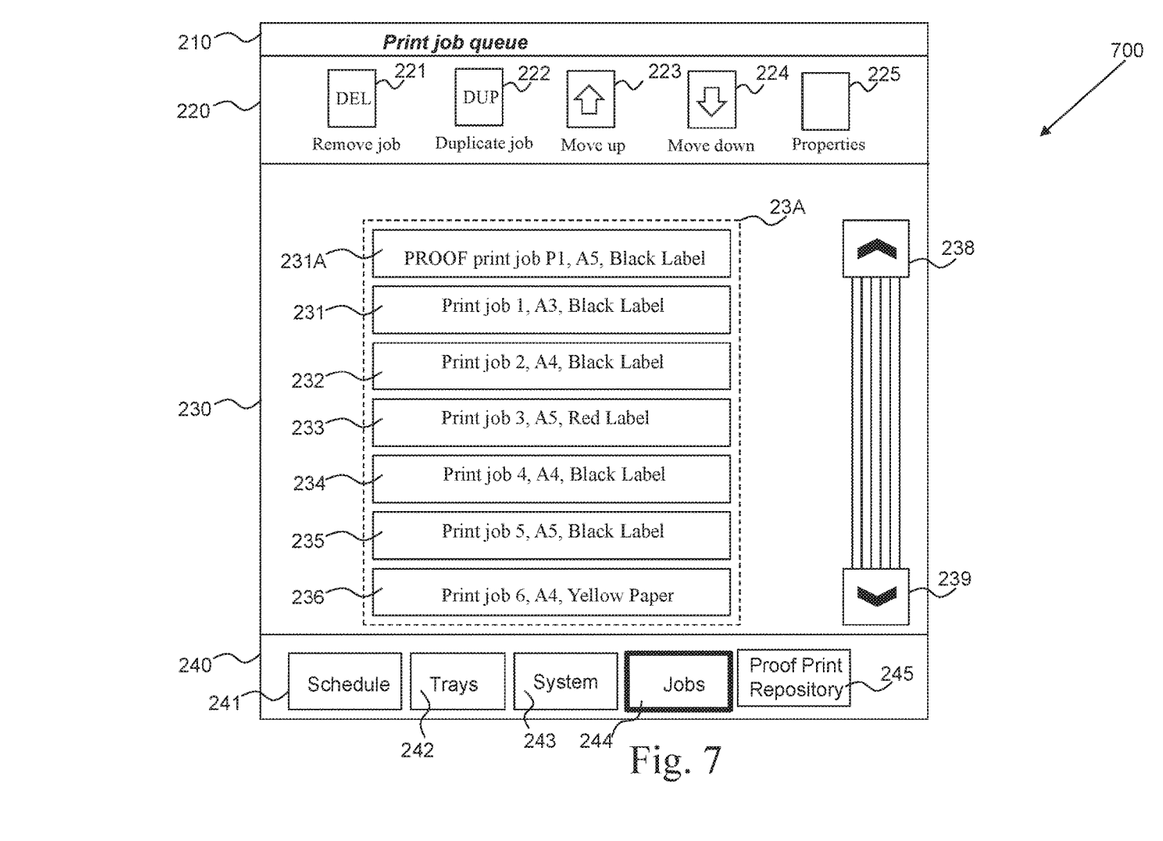
FIGS. 7-11 are examples of a user interface window of the print job queue in which a proof print job is scheduled according to the present invention.

FIG. 7 shows a first example wherein a first proof print job P1 is scheduled at the head of the print job queue 23A at a position 231A. The proof print policy of the first proof print job P1 has a comparison criterion of matching an equal size ("A5") of the recording material in the printing system and the medium type ("Black Label"). The scheduling option of the proof print job P1 is "Append to head of print job queue". For explanatory reasons the current resources are assumed to be "A5 Black Label". Since the comparison criterion matches with the current resources the proof print job P1 is appended to the head of the print job queue 43A at the position 231A before the first scheduled production print job 231.

Figure 8:
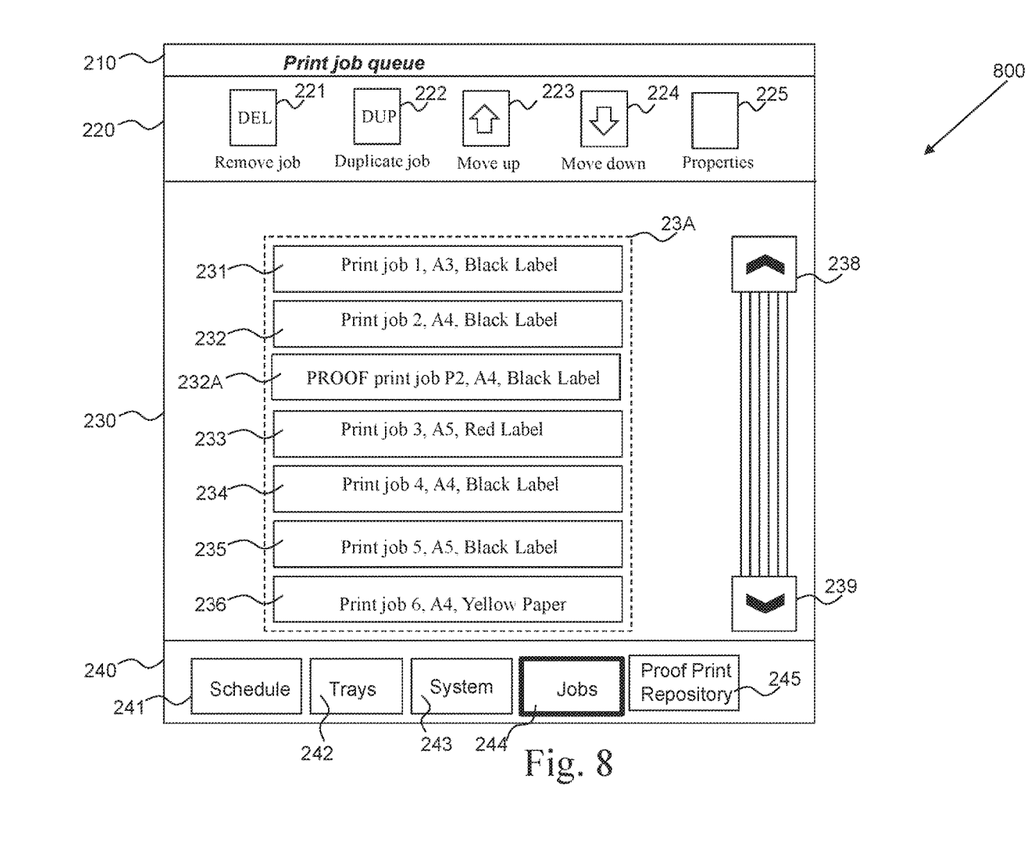

FIG. 8 shows a second example wherein a second proof print job P2 is scheduled at a position 232A after a second scheduled production print job 232. The proof print policy of the second proof print job P2 has a comparison criterion of matching an equal size ("A4") of the recording material in the printing system and the medium type ("Black Label"). The scheduling option of the proof print job P2 is "After an earliest matching print job in print job queue". The current resources are "A5 Black Label" so the comparison criterion of the second proof print job P2 does not match the current resources. In a further embodiment the proof print policy is now matched with each of the print jobs in the print job queue 23A. Since the comparison criterion matches with the second scheduled production print job 232 the proof print job P1 is inserted after the second production print job 232 at a position 232A in the print job queue 23A.

Figure 9:
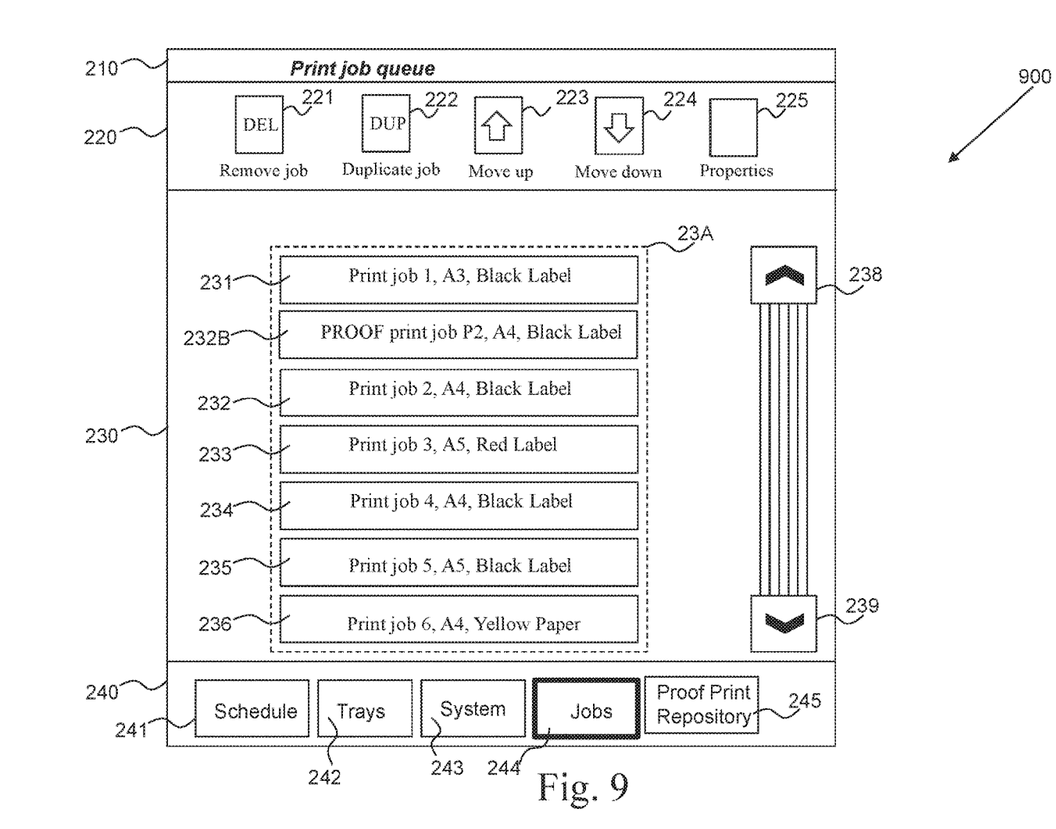

FIG. 9 shows a third example wherein a second proof print job P2 is scheduled at a position 232B before a second scheduled production print job 232. The proof print policy of the second proof print job P2 has a comparison criterion of matching an equal size ("A4") of the recording material in the printing system and the medium type ("Black Label"). The scheduling option of the proof print job P2 is "Before an earliest matching print job in print job queue". The current resources are "A5 Black Label" so the comparison criterion of the second proof print job P2 does not match the current resources. In a further embodiment the proof print policy is now matched with each of the print jobs in the print job queue 23A. Since the comparison criterion matches with the second scheduled production print job 232 the proof print job P2 is inserted before the second production print job 232 at a position 232B in the print job queue 23A.

Figure 10:
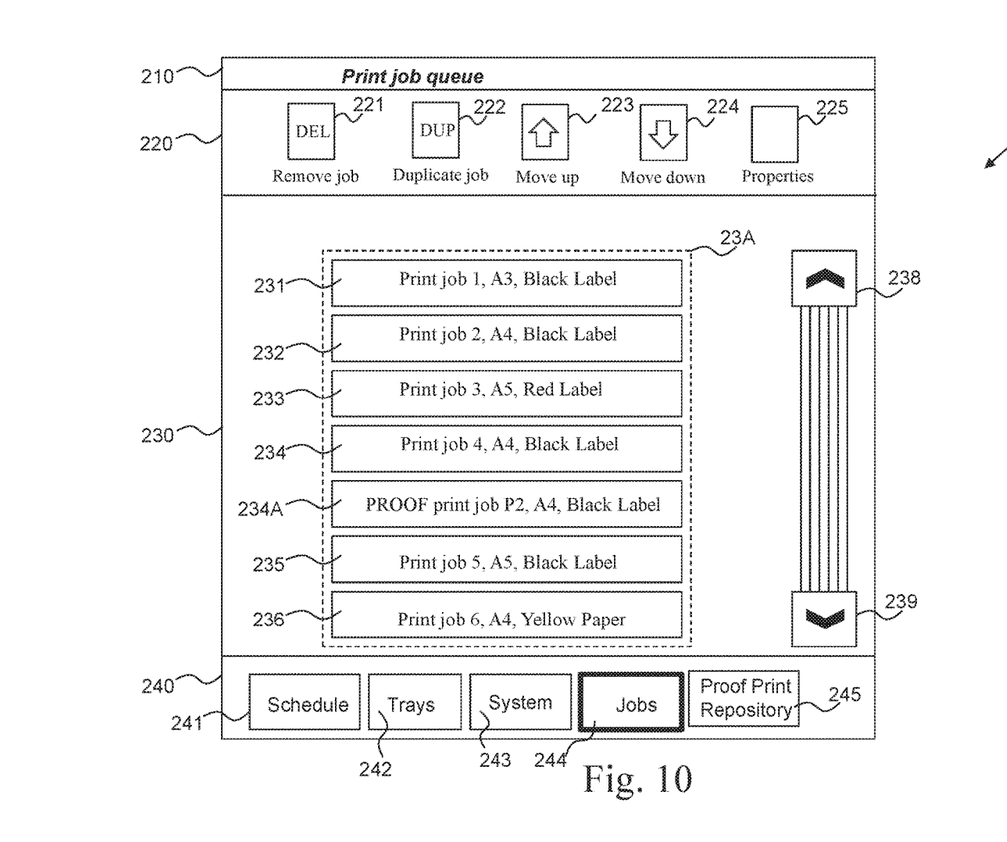

FIG. 10 shows a fourth example wherein the second proof print job P2 is scheduled at a position 234A after a fourth scheduled production print job 234. The proof print policy of the second proof print job P2 has a comparison criterion of matching an equal size ("A4") of the recording material in the printing system and the medium type ("Black Label"). The scheduling option of the proof print job P2 is changed into "After a last matching print job in print job queue". The current resources are "A5 Black Label" so the comparison criterion of the second proof print job P2 does not match the current resources. In a further embodiment the proof print policy is now matched with each of the print jobs in the print job queue 23A. Since the comparison criterion matches with the second scheduled production print job 232 and with the fourth scheduled production print job the proof print job P2 is inserted after the fourth production print job 234 at a position 234A in the print job queue 23A.

Figure 11:
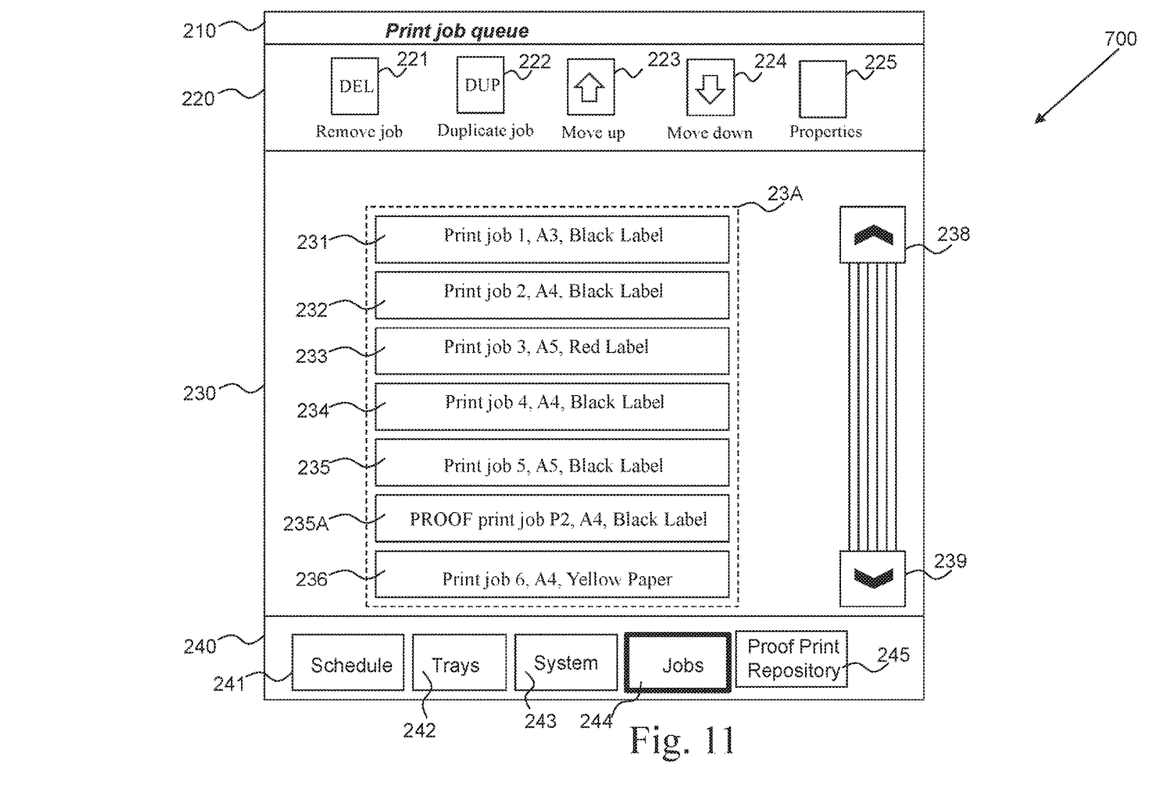

FIG. 11 shows a fifth example wherein the second proof print job P2 is scheduled at a position 235A after a fifth scheduled production print job 235. The proof print policy of the second proof print job P2 has now a changed comparison criterion of allowing image scaling on the recording material and matching the medium type ("Black Label"). The scheduling option of the proof print job P2 is now "After a last matching print job in print job queue". The current resources are changed into "A5 Yellow Paper" so the comparison criterion of the second proof print job P2 does not match the current resources. In a further embodiment the proof print policy is now matched with each of the print jobs in the print job queue 23A. Since the comparison criterion matches with the scheduled production print jobs 231, 232, 234 and 235 the proof print job P2 is inserted after the fifth production print job 235 at a position 235A in the print job queue 23A.

The skilled person will recognize that other embodiments are possible within the scope of the appended claims.

The invention claimed is:
1. A printing system, comprising:
a print engine equipped with a processor, operable to function as a print job receiving section permitting a user to submit a print job to the printing system, the print job comprising a plurality of print job settings, a print job queue section comprising a print job queue for print jobs submitted to the printing system and scheduled to be printed, a proof print repository section comprising a proof print repository for proof print jobs submitted to the printing system, and a continuous monitoring section configured to continuously compare print job settings of a proof print job residing in the proof print repository or scheduled in the print job queue with current resources available in the printing system according to a proof print policy, the proof print policy being attached to the proof print job and comprising a comparison criterion, and an adornment option for adding a digital adornment to the proof print job, the digital adornment intended to be printed on the first sheet or the last sheet of the proof print job, on a banner sheet or a trailer sheet to be added to the proof print job, or on each sheet of the proof print job, wherein upon a match of the print job settings of the proof print job with the current resources according to the comparison criterion, the proof print job is scheduled in the print job queue, and wherein the print engine is configured to print the proof print job with the digital adornment as scheduled in the print job queue such that the proof print job is only printed when the print job settings of the proof print job match with the current resources according to the comparison criterion.

2. The printing system according to claim 1, wherein the continuous monitoring section is configured to schedule a print job corresponding to the proof print job in the print job queue after the proof print job is printed and approved.

3. The printing system according to claim 1, wherein the comparison criterion is based on at least one out of at least one medium type property of the current resources, a print mode specified in the print job, a color profile specified in the print job and at least one marking material property of the current resources.

4. The printing system according to claim 1, wherein the proof print policy comprises a scheduling option, and wherein upon a match of the print job settings of the proof print job with the current resources according to the comparison criterion, the proof print job is scheduled at a position in the print job queue according to the scheduling option.

5. The printing system according to claim 4, wherein the continuous monitoring section is configured to compare print job settings of a proof print job residing in the proof print repository or scheduled in the print job queue with print job settings of each print job in the print job queue according to the comparison criterion, and wherein upon a mismatch of the print job settings of the proof print job with the current resources, the continuous monitoring system compares the print job settings of the proof print job with print job settings of each print job in the print job queue according to the comparison criterion, upon a match of the print job settings of the proof print job with print job settings of one of the print jobs in the print job queue, the proof print job is scheduled before or after the one print job in the print job queue according to the scheduling option, and upon a mismatch of the print job settings of the proof print job with print job settings of each of the print jobs in the print job queue, the proof print job is moved back into or remains in the proof print repository.

6. The printing system according to claim 1, wherein the proof print repository is configured to maintain a proof print status for each proof print job in the proof print repository.

7. The printing system according to claim 1, wherein the print engine equipped with the process or is further operable to function as a proof print logging section which is configured to keep an automatic log of the proof print jobs in the proof print repository.

8. The printing system according to claim 1, wherein the proof print policy comprises a specification of a location of the digital adornment on a sheet of the proof print job.

9. A method for scheduling proof print jobs in a printing system, the printing system comprising a print job receiving section permitting a user to submit a print job to the printing system, the print job comprising a plurality of print job settings, a print job queue section comprising a print job queue for print jobs submitted to the printing system and scheduled to be printed, and a proof print repository section comprising a proof print repository for proof print jobs submitted to the printing system, wherein the method comprises the steps of continuously comparing print job settings of a proof print job residing in the proof print repository or scheduled in the print job queue with current resources available in the printing system according to a proof print policy attached to the proof print job, the proof print policy comprising a comparison criterion, and an adornment option for adding a digital adornment to the proof print job, the digital adornment intended to be printed on the first sheet or the last sheet of the proof print job, on a banner sheet or a trailer sheet to be added to the proof print job, or on each sheet of the proof print job, upon a match of the print job settings of the proof print job with the current resources according to the comparison criterion, scheduling the proof print job in the print job queue, and printing the proof print job with the digital adornment as scheduled in the print job queue such that the proof print job is only printed when the print job settings of the proof print job match with the current resources according to the comparison criterion.

10. The method according to claim 9 wherein the method comprises the step of scheduling a print job corresponding to the proof print job in the print job queue after the proof print job is printed and approved.

11. The method according to claim 9, wherein the proof print policy comprises a scheduling option and the method comprises the step of, upon a match of the print job settings of the proof print job with the current resources according to the comparison criterion, scheduling the proof print job at a position in the print job queue according to the scheduling option.

12. The method according to claim 9, wherein the method comprises the steps of:

upon a mismatch of the print job settings of the proof print job with the current resources, comparing the print job settings of the proof print job with print job settings of each print job in the print job queue according to the comparison criterion, upon a match of the print job settings of the proof print job with print job settings of one of the print jobs in the print job queue, scheduling the proof print job before or after the one print job in the print job queue according to the scheduling option, and upon a mismatch of the print job settings of the proof print job with print job settings of each of the print jobs in the print job queue, moving the proof print job back into the proof print repository if the proof print job is residing in the print job queue or keeping the proof print job in the proof print repository if the proof print job is residing in the proof print repository.

13. The method according to 9, wherein the proof print policy comprises a specification of a location of the digital adornment on a sheet of the proof print job.

14. A software product comprising program code on a non-transitory computer-readable medium, wherein said program code, when loaded into a computer that is connected to or is part of a printing system causes the computer to act according to a method of claim 9.

* * * * *